No. 680,829. Patented Aug. 20, 1901.
F. WILCOMB.
BRAKE MECHANISM FOR KNITTING MACHINES.
(Application filed May 18, 1901.)
(No Model.)
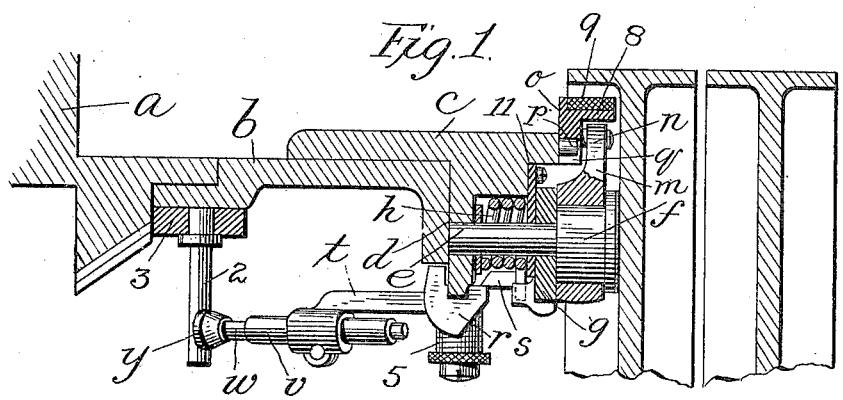
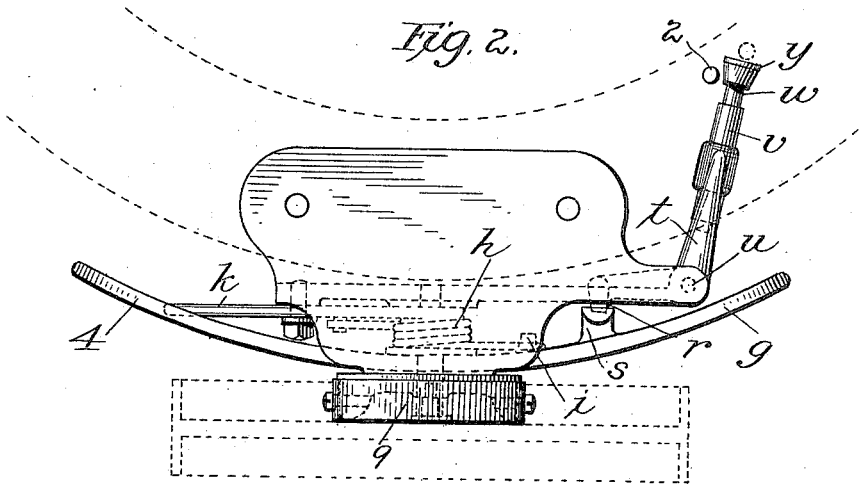
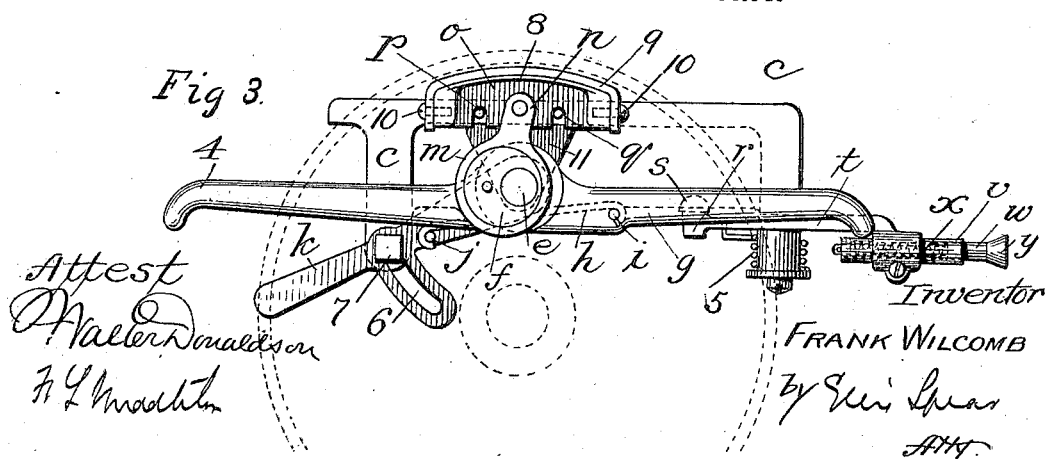
Attest
Walter Donaldson
Inventor
FRANK WILCOMB
by Ellis Spear
Atty.

UNITED STATES PATENT OFFICE.

FRANK WILCOMB, OF NORRISTOWN, PENNSYLVANIA.

BRAKE MECHANISM FOR KNITTING-MACHINES.

SPECIFICATION forming part of Letters Patent No. 680,829, dated August 20, 1901.

Application filed May 18, 1901. Serial No. 60,902. (No model.)

*To all whom it may concern:*

Be it known that I, FRANK WILCOMB, a citizen of the United States, residing at Norristown, Montgomery county, Pennsylvania, have invented certain new and useful Improvements in Brake Mechanism for Knitting-Machines, of which the following is a specification.

My invention comprises, among other features, a friction-shoe arranged to engage the inner periphery of the driving-pulley to act as a brake thereon, whereby the outer periphery of the said pulley is left free for belting in any direction.

My invention also includes a special form of trip device for controlling the brake and means whereby the brake-spring may be readily and accurately adjusted to get the desired braking-pressure upon the driving-pulley.

As an exemplary form of my invention I have shown it carried out in connection with parts of a knitting-head, such as illustrated, for instance, in Letters Patent of the United States granted to Abner McMichael and Frank B. Wildman, No. 498,076, filed May 23, 1893.

In the accompanying drawings, Figure 1 represents in section part of a knitting-head with my invention attached, partly in section and partly in side elevation. Fig. 2 is a plan view of my attachment, and Fig. 3 a front view of the same.

In the drawings, $a$ is part of the cylinder of the knitting-head, and $b$ represents part of the base-ring of said head. To this base-ring is attached a bracket $c$, in which, supported at $d$, is a pin $e$. On this pin an eccentric $f$ is supported, and this is rotated by a lever $g$, supported by the pin and under tension of a spring $h$, which encircles the pin $e$ and engages a pin $i$ at one end, located upon the lever $g$, and at its other end the said spring engages a pin $j$, carried by an arm $k$, which is adapted, as will be hereinafter described, to be fixed rigidly in different positions to alter the tension of the spring. The eccentric is arranged to operate an eccentric-strap $m$, the arm $n$ of which is pivotally connected with the brake-shoe $o$. This brake-shoe is guided in its vertical movement by pins $p$, extending from the face of the bracket $c$ into notches $q$, formed in the brake-shoe. These pins prevent the brake-shoe from tipping out of proper position. The eccentric-lever $g$ is controlled by a tripping device comprising a catch $r$, arranged to engage under a stud $s$ on the lever, said catch being formed on a bell-crank lever $t$, pivoted to the bracket $c$ at $u$ and carrying at its outer end a barrel $v$, in which a plunger $w$ is arranged to slide, said plunger, however, being pressed normally outwardly by a spring $x$ in the barrel. The plunger has a head $y$ of conical form, and this lies normally in the path of a pin or pins 2, carried by a shogging-ring 3, supported on the knitting-head and arranged to be operated by any suitable let-off connections, so that when the pin 2 strikes the conical head of the tripping-lever the said trip-lever will be swung to move the catch from the stud $s$, thus allowing the eccentric-lever free movement under the tension of spring $h$, which will then turn the lever to rotate the eccentric, thus raising the eccentric-strap and its arm $n$ and forcing the brake-shoe upwardly against the inner side of the pulley-flange to thus stop the machine. It will be noticed that by arranging the brake-shoe to operate against the inner side of the pulley-flange the machine may be belted from any direction desired, as the outer periphery of the pulley is left entirely free for this purpose. When it is desired to start the machine again, the handle 4 of the eccentric-lever is forced downwardly, thus raising the catch or stud $s$ to be engaged by the latch $r$ of the trip-lever, for which purpose the engaging surfaces of the parts $r$ and $s$ are inclined and for which purpose also the trip-lever is allowed to yield against the tension of a spring 5, coiled about its pivotal axis. This spring returns the tripping-lever to normal position to engage the eccentric-lever as soon as the conical head of the tripping-lever is released by the pin 2 passing out of engagement therewith—for instance, to the point indicated in dotted lines in Fig. 2. By this arrangement the brake-shoe may be withdrawn from the pulley and the mechanism reset for another operation whenever desired after the machine has been stopped and without regard to the position of the pin 2 with relation to the tripping-lever, whether it be in the position shown in dotted lines or not, for upon the movement of the shogging-ring to return the pin 2 from the position shown in dotted lines the said pin striking against the flat face of the conical head of the tripping-lever plunger will simply force the same backwardly into the plunger-cylinder without displacing the lever and without damage to the parts. As soon as the pin 2 has passed from the flat face of the conical head the plunger is forced outwardly by the pressure of its spring, and thus assumes a position ready to be engaged and operated by the pin when the machine is to be stopped.

In order to adjust the tension of the eccentric-lever spring $h$, the lever $k$, to which one end of the spring is attached, is pivoted on the pin $e$ and is provided with a segmental slot 6, struck from the center of the pin and through which passes a clamping bolt or screw 7 into the bracket $c$. By this screw the lever can be set in different positions to adjust the tension of the spring. The brake-shoe has a flange 8 overhanging the eccentric-strap and its pivot, and upon this is supported a leather wearing-piece 9, which is attached by screws 10 to the shoe.

For furnishing additional support for the pin $e$ I provide a plate or bracket 11, screwed to the main bracket $c$ and having a bearing at its lower end to receive the pin $e$. The eccentric $f$ may be pinned to the eccentric-lever or otherwise connected to be operated when the said lever is moved.

I claim—

1. In combination in a brake mechanism, a driving-pulley, a brake-shoe, an eccentric, a strap operated thereby and connected with the brake-shoe, a lever connected with the eccentric and a coiled spring encircling the axis of the eccentric and connected with the lever, substantially as described.

2. In combination in a brake mechanism, a driving-pulley, a brake-shoe, an eccentric and an eccentric-strap connected to the shoe, a lever for operating the eccentric and a trip-lever for controlling the eccentric-lever, said trip-lever having a yielding plunger to be engaged by a part of the machine, substantially as described.

3. In combination in a brake mechanism, a driving-pulley, a brake-shoe to engage the same and means for operating the brake-shoe and a trip device for said means comprising a lever one arm of which is provided with a plunger moving longitudinally thereof and a spring for holding said plunger in normal position, substantially as described.

4. In combination in a brake mechanism, a driving-pulley, a brake-shoe to engage the same and means for operating the brake-shoe and a trip device for said means comprising a lever one arm of which is provided with a plunger moving longitudinally thereof and a spring for holding said plunger in normal position, said plunger having a conical head and a pin on the machine to engage said head, substantially as described.

5. In combination in a brake mechanism, a driving-pulley, a brake-shoe, means for operating the brake-shoe including an eccentric and an eccentric-strap, a lever connected with the eccentric, a coiled spring connected with the lever and encircling the axis of the eccentric and means for adjusting the tension of said spring, substantially as described.

6. In combination in a brake mechanism, a driving-pulley, a brake-shoe, means for operating the brake-shoe including an eccentric and an eccentric-strap, a lever connected with the eccentric, a coiled spring connected with the lever and encircling the axis of the eccentric and means for adjusting the tension of said spring, said means including a lever pivoted axially of the eccentric and connected to the spring with means for holding said lever in different positions, substantially as described.

7. In combination in a brake mechanism, a driving-pulley, a brake-shoe arranged to engage the inner side thereof, an eccentric and an eccentric-strap for operating the brake-shoe, said strap being pivoted centrally of the brake-shoe and means for guiding the brake-shoe in its movement, substantially as described.

In testimony whereof I affix my signature in presence of two witnesses.

FRANK WILCOMB.

Witnesses:
HAROLD CORSON,
CARRIE G. CORSON.